United States Patent [19]

Russo

[11] Patent Number: 4,923,661
[45] Date of Patent: May 8, 1990

[54] METHOD AND APPARATUS FOR MAKING BRAKE PADS

[75] Inventor: Sergio Russo, Faiano, Italy

[73] Assignee: Abex Corporation, Boston, Mass.

[21] Appl. No.: 221,787

[22] PCT Filed: Oct. 7, 1987

[86] PCT No.: PCT/EP87/00577
§ 371 Date: Aug. 5, 1988
§ 102(e) Date: Aug. 5, 1988

[87] PCT Pub. No.: WO88/02685
PCT Pub. Date: Apr. 21, 1988

[30] Foreign Application Priority Data

Oct. 14, 1986 [IT] Italy.................. 21997 A/86

[51] Int. Cl.⁵ .......................... B29C 31/08; B28B 5/04
[52] U.S. Cl. ..................................... 264/119; 264/259; 264/297.8; 264/334; 264/DIG. 65; 425/112; 425/121; 425/126.1; 425/229; 425/261; 425/397; 425/412; 425/447
[58] Field of Search ............... 264/112, 118, 119, 120, 264/259, 263, 297.1, 294, 297.8, 297.9, DIG. 36, 267, DIG. 65, 334; 425/256-261, 156, 166, DIG. 45, 116, 447, 448, 395, 397, 398, 403.1, 412, 414, DIG. 108, 112, 121, 126.1, 229, 128, 117; 29/331 P

[56] References Cited

U.S. PATENT DOCUMENTS

| 2,569,227 | 9/1951 | Carter | 425/448 |
|---|---|---|---|
| 2,963,762 | 12/1960 | Kovach | 425/447 |
| 3,076,229 | 2/1963 | Arpajian | 425/448 |
| 3,389,427 | 6/1968 | Reyburn | 425/163 |
| 3,608,140 | 9/1971 | Ratcliffe | 425/412 |
| 3,887,685 | 6/1975 | Stelzmuller | 425/412 |
| 3,998,573 | 12/1976 | Gilbert et al. | 425/117 |
| 4,138,463 | 2/1979 | Moneghan | 264/122 |
| 4,432,922 | 2/1984 | Kaufman et al. | 264/120 |
| 4,580,964 | 4/1986 | Repella | 425/126.1 |
| 4,652,415 | 3/1987 | Nguyen et al. | 264/275 |

FOREIGN PATENT DOCUMENTS 2003088 3/1979 United Kingdom .

Primary Examiner—Jeffery Thurlow
Assistant Examiner—Mathieu Vargot
Attorney, Agent, or Firm—Thomas S. Baker, Jr.

[57] ABSTRACT

An apparatus and a method of making brake pads (60) having the step of heat preforming a plurality of dosages (39) of a friction material for brake pads (60) to obtain a plurality of blanks (61) on which respective metal holders (53) are then placed, and the step of hot molding, individually and simultaneously, such blanks (61) to form a plurality of brake pads (60).

20 Claims, 10 Drawing Sheets

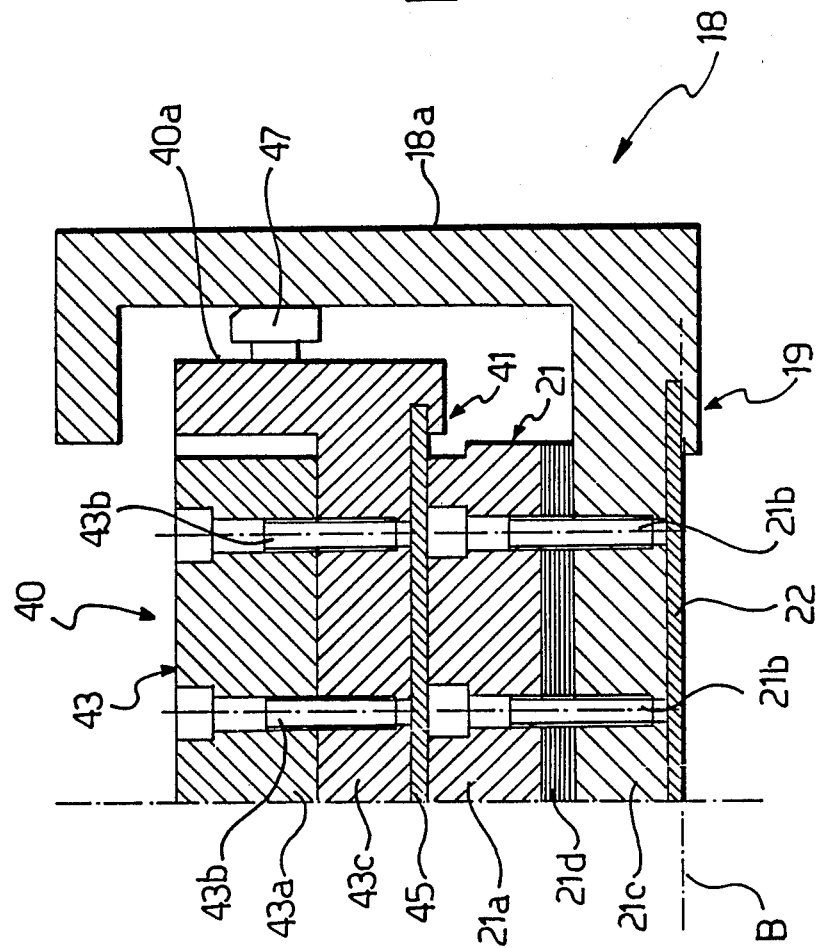

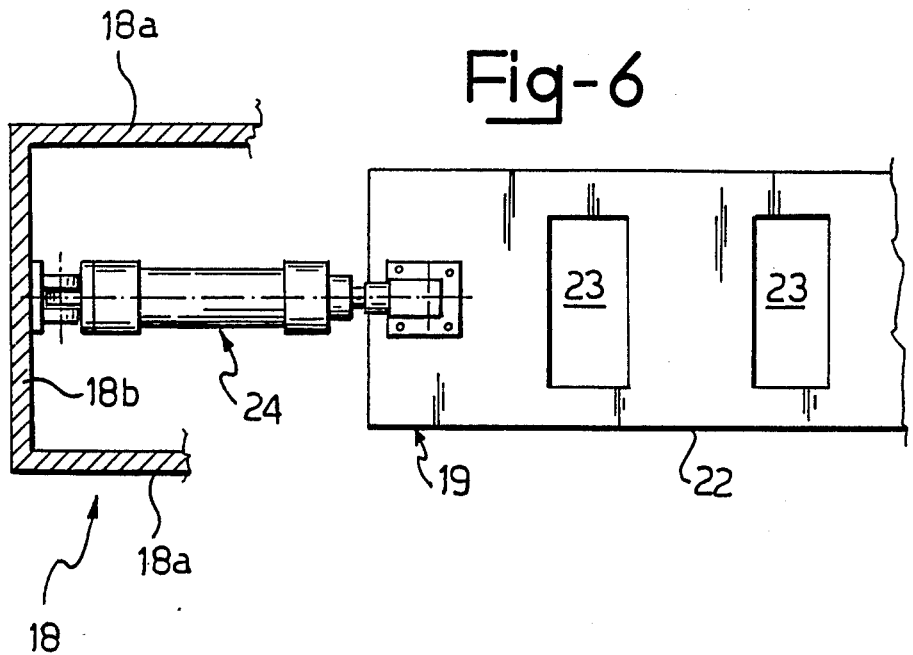
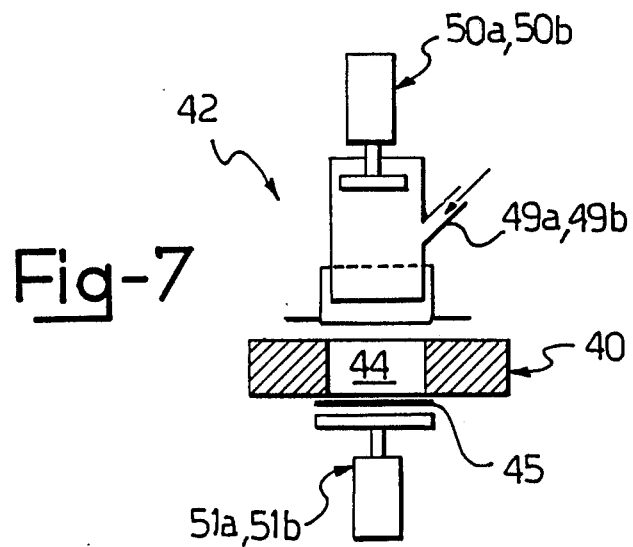

METHOD AND APPARATUS FOR MAKING BRAKE PADS

BACKGROUND OF THE INVENTION

1. Field of the Invention

This invention relates to a method of making brake pads and the like from a brake friction material.

2. Background Art

Brake pads, and for that matter brake shoes or liners, are usually formed from a blend of friction materials and binders; the blend is first proportioned, and then heated and pressed in specially provided molds to make it fast with metal supports or plates, possibly after a suitable clinging substrate has been interposed between the friction material blend and the metal support.

In an effort to raise the output, specifically by reducing the time required for hot-pressing through the molding press—on which time the production rate is largely dependent—conventional methods have provided for a pre-heating step of the friction material dosages. In fact, with such a pre-heating step, the hot-press molding machine operation time could be cut down by up to 50% with some friction material blend types.

Conventional methods provide for pre-compacting, where feasible by a cold process, the brake pad friction material dosages within specially provided mold cavities, followed by placement of the pre-compacted dosages on a tray. Thereafter, the tray is preheated and taken manually, along with the heated dosages thereon, to the molding machine, the metal supports are positioned, and a final hot-molding step is completed.

Such conventional methods have the well-recognized disadvantage of yielding occasionally a non-uniform product, because if the friction material is not properly metered into the mold cavities and the pre-compacted dosages are not all exactly of the same weight, the molding machine is apt to apply different pressures to the various dosages since it acts over a common pressure plane for all the mold cavities.

Note is made, moreover, that ahead of the final molding step, the friction material dosages would not yet be sufficiently coherent to permit of convenient handling.

In addition, where the friction material is compounded of such materials as Kevlar, glass fiber, or some other constituents of the most commonly used fibrous compositions based on asbestos, difficulties are experienced during the initial brake pad-making steps, also because such compositions cannot be effectively pre-compacted by a cold process.

Lastly, since the operations involved are to be largely carried out manually, keeping a close control of the pre-heating and molding machine residence times is difficult with conventional methods. More or less conspicuous variations in these times may result in significant alterations of the quality levels of the brake pads obtained.

SUMMARY OF THE INVENTION

The problem underlying this invention is to provide a method of making brake pads and the like from a brake friction material which can obviate the cited deficiencies of conventional methods.

This problem is solved by a method as specified hereinabove which comprises the steps of:

pre-compacting a plurality of dosages of a friction material for brake pads;

hot pre-forming said dosage plurality to yield a corresponding plurality of blanks; and hot-pressing said blanks, individually and simultaneously, to form a plurality of brake pads.

Further features and the advantages of a method according to the invention will be more clearly understood from the following detailed description of a preferred embodiment thereof, given herein by way of illustration and not of limitation with reference to an apparatus shown in the accompanying drawings.

BRIEF DESCRIPTION OF THE DRAWINGS

FIG. 5 is an enlarged scale, fragmentary sectional view taken along the line V—V in FIG. 4;

FIG. 6 is a plan view of a detail of FIG. 4, taken in the direction of the arrow VI;

FIG. 7 is an enlarged scale view showing diagramatically a detail of FIG. 2, in cross-section along the line VII—VII;

DESCRIPTION OF THE PREFERRED EMBODIMENT

Figure 1:
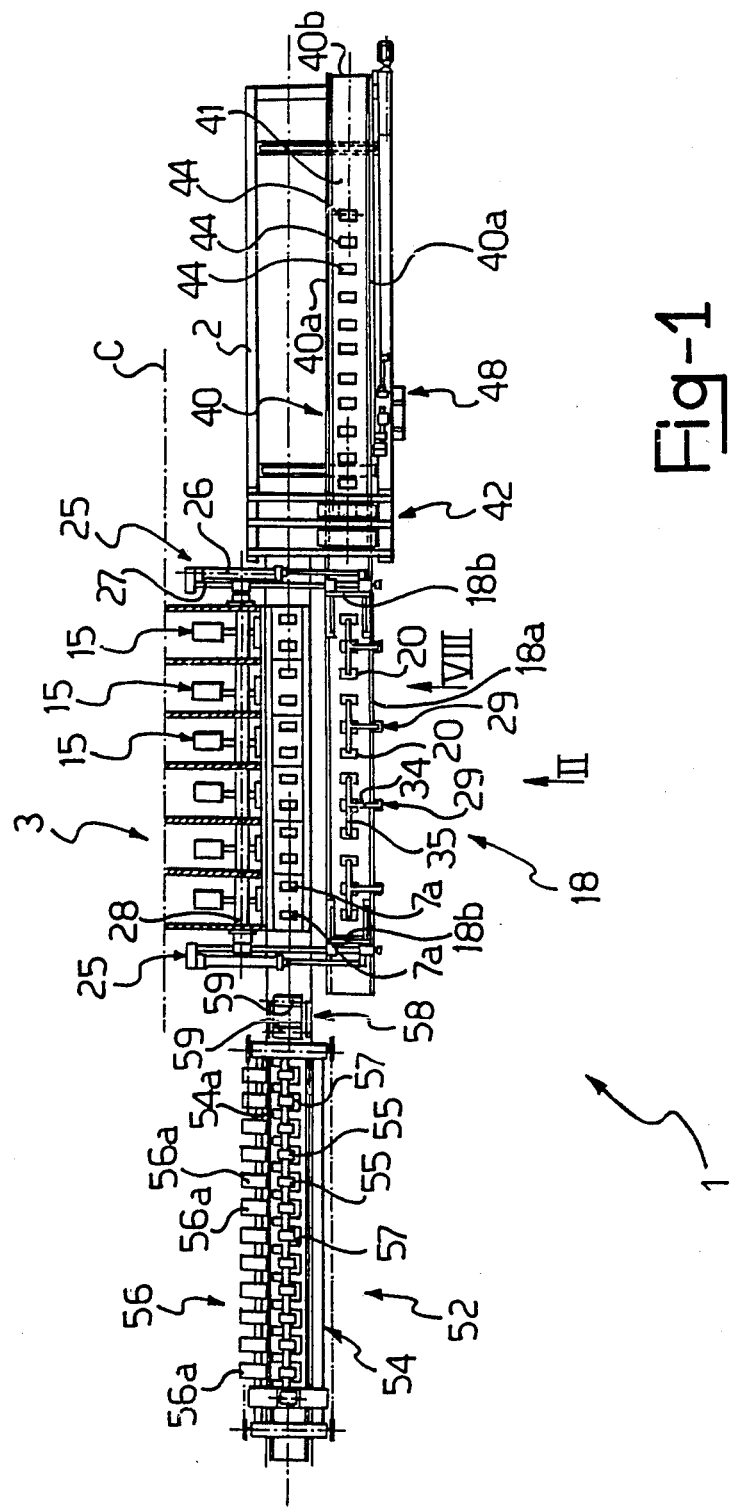
FIG. 1 is a top plan view showing diagramatically an apparatus for implementing the brake pad-making method of this invention.
Figure 2:
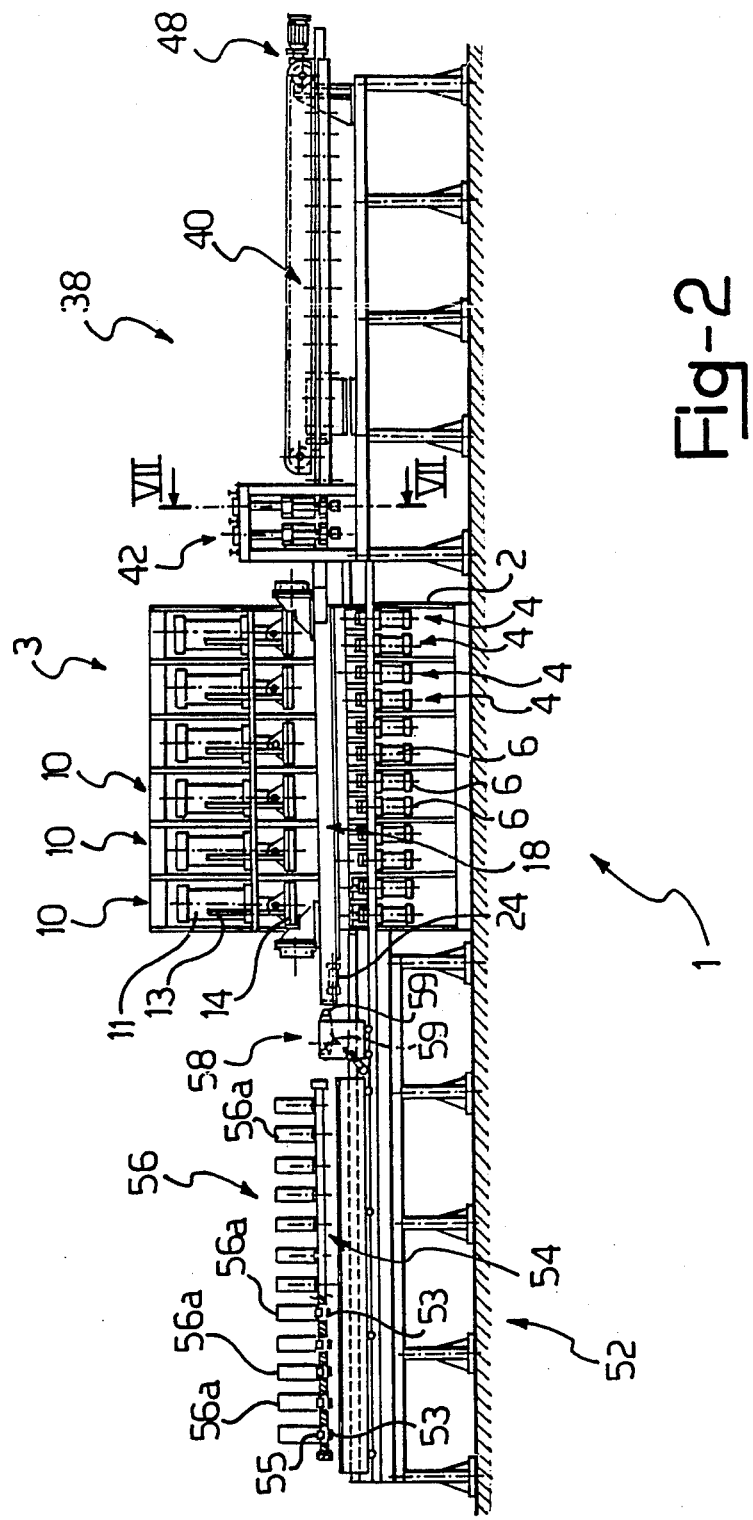
FIG. 2 is a fragmentary elevation view showing diagramatically the apparatus of FIG. 1.
Figure 3:
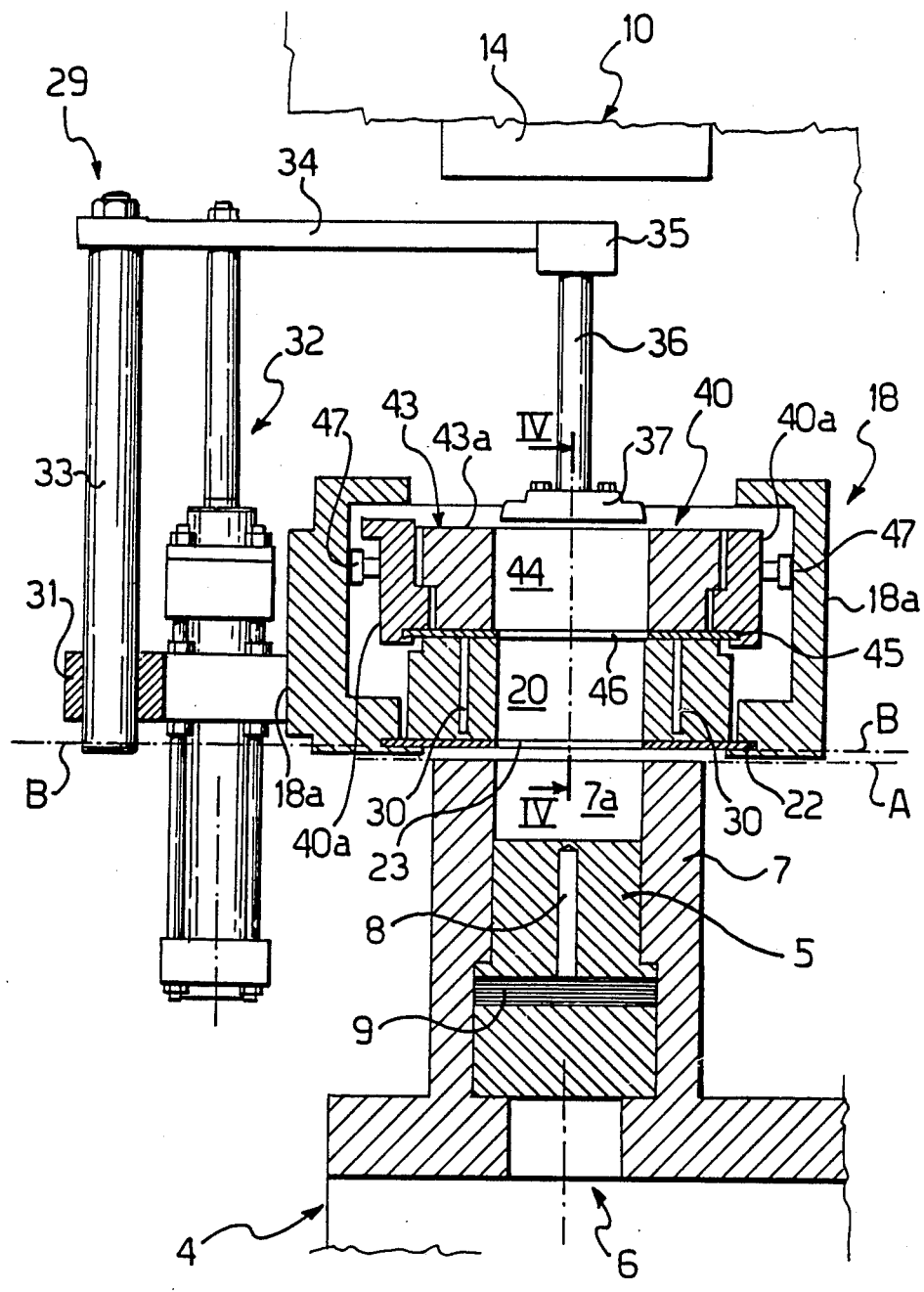
FIG. 3 is an enlarged scale cross-section view of a detail of the apparatus of FIG. 1, shown in a different operating condition.
Figure 4:
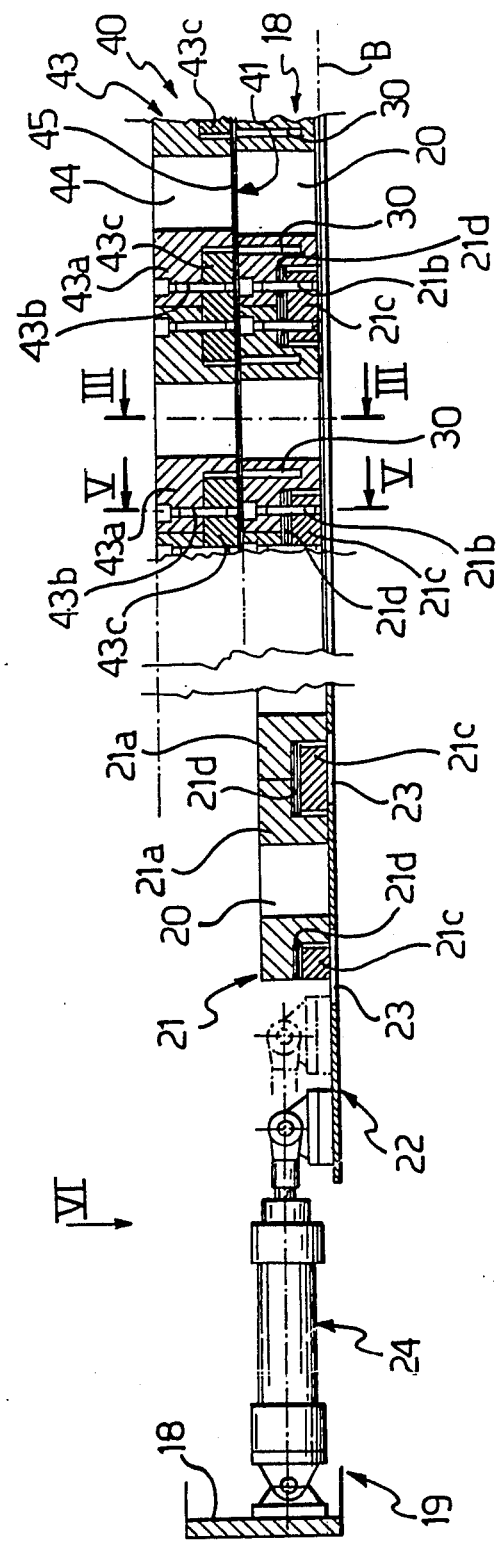
FIG. 4 is a longitudinal sectional view, taken along the line IV—IV in FIG. 3, of a detail of the apparatus shown in FIG. 1, in yet another operating condition thereof.
Figure 8:
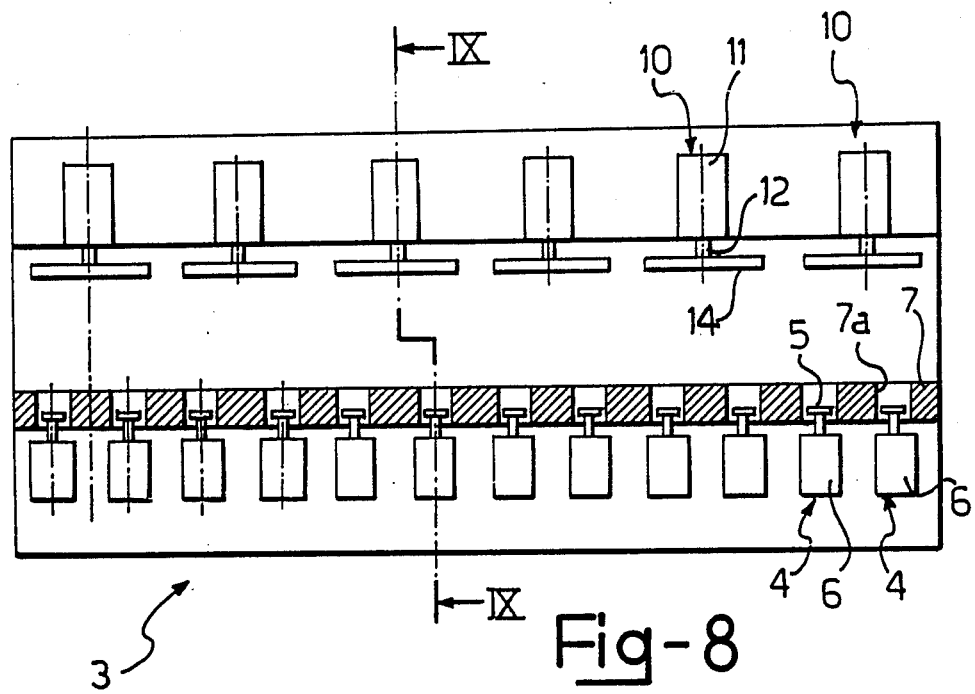
FIG. 8 is an enlarged scale, part-sectional view showing diagramatically a detail of FIG. 1 as viewed in the direction of the arrow VIII.

With reference to the drawing figures, the numeral 1 generally designates an apparatus for making, in accordance with this invention, brake pads and the like from a brake friction material, which apparatus comprises a supporting frame 2.

The apparatus 1 comprises a multiple press 3 for hot-molding, which is composed of twelve single hot-molding presses 4, which are mechanically independent of one another but interconnected hydraulically in a manner known per se. The single presses 4 are aligned to one another and laid side-by-side, and have respective horizontal upper molding planes, collectively designated A, which are coplanar with one another.

Each press 4 is equipped with a lower punch 5, which is movable vertically from and toward the horizontal molding plane A by the action of a respective cylinder/piston unit 6, and acting during its upward stroke on a respective molding seat 7a formed in a die 7 whose top end is flush with the horizontal plane A.

Each lower punch 5 has a cylindrical cavity 8 therein, accommodating conventional means, not shown, of heating the punch. Underneath the cavity 8, the punch 5 is provided with a horizontal layer 9 of an insulative material, effective to isolate the punch 5 thermally from the underlying components of the press 4.

The multiple press 3 also comprises six upper pressure units 10, each comprising, in turn, a cylinder 11 and its respective piston 12, a pair of guide bars 13 parallel with the cylinder11/piston 12 assembly, and a plate 14 carried on the piston 12 and the guide bars 13. The plate 14 of each upper pressure unit 10 is movable vertically from and toward the plane A and arranged to act on a respective pair of the adjacent molding seats 7A. Advantageously, the plate 14 is also provided with heater means and an inner layer of an insulative material, not shown.

In addition, each press 4 includes an emptying and cleaning device 15 consisting of a cylinder/piston unit 16 and a pair of juxtaposed brushes, 17A and 17B, movable in a parallel direction to the plane A and acting respectively on the plate 14 and the die 7, at the top thereof.

The apparatus 1 of this invention includes a carriage 18 with a moving bottom 19, which carriage, hereinafter also referred to as the hot carriage, is movable from a position inside the multiple press 3, whereat its bottom 19 would be located in the plane A, to a position outside the press 3, and vice versa, as will be explained hereinafter.

The hot carriage 18 is of box-shaped, elongate construction in a direction lying parallel to the single presses 4, has an open top and major sidewalls 18a, oppositely located and extending parallel to the multiple press 3, and minor sidewalls, indicated at 18b. Furthermore, in the hot carriage 18, there are formed twelve molding cavities 20, aligned together and in mutually spaced-apart relationship, being open both the bottom and the top. More specifically, the molding cavities 20 are formed in a parallelepipedic body 21 inside the hot carriage 18, being carried thereon at the moving bottom 19.

More precisely, the body 21 is formed of twelve side-by-side dies 21a secured by screws 21b on parallel supports 21c lying across the hot carriage 18 and being made fast therewith at a location close to the bottom 19.

Layers 21b of a thermally insulative material are advantageously interposed to the dies 21a and the supports or holders 21c.

The moving bottom 19 of the hot carriage 18 includes a sheet-like metal guillotine 22 extending below the body 21, wherein twelve apertures 23 are formed to correspond with the cavities 20. Further, the guillotine 22 is supported on the bottom 19 in a freely sliding manner between a first position where it would shut off the cavity 20 bottoms and a second position where its apertures 23 would align to the cavities 20, which are thus put in communication with the outside also underneath the hot carriage 18.

The reference numeral 25 comprehensively designates a hydraulically-operated device for moving the hot carriage 18 from the external position rearwardly of the multiple press 3 to the position inside the press 3 itself, and vice versa. The device 25 includes a pair of telescoping arms 26 and respective guide bars 27 associated with the arms; in particular, each telescoping arm 26, lying parallel to its respective guide bar 27, is secured at one end to its corresponding minor sidewall 18b of the hot carriage 18.

The telescoping arms 26 and their respective guide bars 27 are mounted, at an opposite end thereof, to a shaft 28 for rotation rigidly therewith. The shaft 28 is, in turn, journalled for free rotation in the frame 2 and extends parallel to the multiple press 3.

According to the invention, pressure means, generally designated 29, and heater means 30 are mounted on the hot carriage 18 and arranged to act on the molding cavities 20 of the carriage.

There are four such pressure means 29, one every three cavities 20, and each of them includes a holder 31 secured to the exterior of one major sidewall 18a located on the remote side from the multiple press 3.

The holder 31 has a hydraulic cylinder/piston unit 32 mounted thereon along with a guide column 33 whose axis lies parallel to the axis of the unit 32 and perpendicular to a plane B containing the guillotine 22.

A first arm 34 is attached rigidly to the tops of both the cylinder/piston unit 32 and the guide column 33, while a second arm 35 is fastened to the first arm 34 to form a rigid T-shaped assembly extending parallel to the plane B.

Perpendicularly to the second arm 35 at end portions and a middle location thereon, there are secured three connection or linking columns whose bottom ends are equipped with respective compacting plates 37 which lie parallel to the plane B and are shaped and sized to mate with the cavities 20, thereby they can be allowed to slide unrestrictedly therein.

Each compacting plate 37 lies parallel to the plane B and . is movable perpendicularly thereto from an upper travel end position, outside the hot carriage 18, to a lower travel end position where each plate 37 would fit into its respective cavity 20 and locates close to the moving bottom 19.

According to the invention, the aforesaid heater means 30 for the hot carriage 18 comprise electric resistance heaters, also designated 30, which are arranged in the body 21 around the molding cavity 20.

The apparatus 1 of this invention includes infeed means, collectively indicated at 38, for feeding in dosages 39 of the friction material and acting on the twelve molding cavities 20 of the hot carriage 18.

The infeed means 38 of dosages 39 are carried on the frame 2 and comprise a second carriage 40 with a moving bottom 41, similar to the hot carriage 18, and a feeding and pre-compacting station arranged to act on it as explained more clearly hereinafter.

The second carriage 40, hereinafter referred to as the cold carriage 40, is also of box-like elongate shape with major sidewalls 40a and minor sidewalls 40b, being open at the top, and having a parallelepipedic inner body 43 formed of twelve dies 43a aligned side-by-side and attached by means of screws 43b to parallel holders 43c lying across the cold carriage 40 so as to be made rigid therewith at a location close to its bottom 41.

In the body 43, there are formed twelve cavities 44, similar to the cavities 20 of the hot carriage 18 and also being aligned in mutually spaced-apart relationship and each formed in a respective die 43a.

Similarly to the hot carriage 18, the cold carriage 40 comprises a sheet-like guillotine 45 with twelve apertures 46 formed therein, which is supported on the bottom 41 underneath the body 43 in a freely slidable manner between a position where the apertures 46 are aligned to the cavities and a position where the guillotine 45 shuts off the bottoms of such cavities 44.

The guillotine 45 is movable between said positions by the action of a cylinder/piston drive means, not shown because perfectly equivalent of the hydraulic drive 24 for the hot carriage 18.

The cold carriage 40 extends substantially in line with the hot carriage 18, but at a higher level. Further, the cold carriage is supported slidingly on the frame 2 in a manner known per se for mobility from a rearward position to a position where the cold carriage 40 is superimposed on the hot carriage 18, with the bottom 41 resting on the body 21 and the cavities 44 aligned to the underlying cavities 20 in the hot carriage 18.

In its sliding movement within the hot carriage 18, the cold carriage 40 is guided by runners 47 carried on the major sidewalls 40a and extending thereacross.

It should be noted that the cold carriage 40, under the action of motive means generally designated 48, can be moved from the rearward position to the position where it overlies the hot carriage 18 with a stepwise forward motion, whereas in the opposite direction, it is brought quickly to said rearward position.

The station 42 for feeding in and pre-compacting dosages 39 is supported on the frame 2 at an intermediate location to said rearward and overlying positions of the cold carriage 40, and includes two side-by-side hoppers 49a and 49b acting on the cavities 44.

The hopper 49a, which would be the first hopper met by the cold carriage 40 in its stepwise movement toward the overlying position, is operative to feed the cavities 44 with dosages 39a of a conventional blend or mixture for brake pads; the hopper 49b is instead operative to feed the cavities 44 with dosages 39b of a fixing substrate, also conventional.

Provided at each hopper 49a, 49b are respective pressure units 50a, 50b acting on the cavities 44 and being associated with respective reaction anvils 51a and 51b active beneath the cold carriage 40 on said guillotine 45, at the cavities 44.

According to the invention, the apparatus 1 further comprises means 52 of feeding conventional metal holders 53 for the brake pads; said means 52 are supported on the frame 2 remotely from the dosage infeed means 38 with respect to the multiple press 3.

Such means 52 include essentially a third carriage 54 and a pad holder 53 feeding station 56 acting on the third carriage 54.

The third carriage 54 is parallelepipedic in shape and elongate to extend in substantial alignment to the single presses 4 in the gang at a higher level than the plane A.

In the third carriage 54, there are defined twelve C-shaped cavities 57 which are aligned together at regular intervals; the cavities 57 are open to the outside of the third carriage 54 both at their bottoms and a major side 54a of the carriage. Furthermore, twelve electromagnets, collectively designated 55, are mounted on the third carriage 54, at the cavities 57, and are operative to retain the metal pad holders 53 inside the cavities 57.

The third carriage 54 is supported for sliding movement by the frame 2 in a conventional manner, and is movable from a rearward position to a position where it is inserted into the multiple press 3 to rest on the plane A of the dies 7, with the cavities 57 overlying the corresponding molding seats 7a of the twelve single presses 4.

The station 56 for feeding in the metal pad holders 53 is mounted at a location close to the rearward position of the third carriage 54 and arranged to act on the cavities 57. In particular, the pad holder infeed station 56 comprises twelve magazines 56a, aligned along the major side 54a of the third carriage 54, at the apertures of the cavities 57, with the third carriage 54 in its rearward position. Further, each magazine 56a is provided at the bottom with a pusher assembly, not shown, effective to push a metal pad holder 53 out of the magazine, wherein the pad holders would be stacked together, toward a corresponding cavity 57 wherein the metal pad holder would be retained by a respective one of the electromagnets 55.

The reference numeral 59 designates generally a mold cleaning unit mounted on the third carriage 54, at a minor side thereof facing the multiple press 3, and equipped with a pair or roller brushes 59 adapted for cleaning the dies 7 and plates 3 as the third carriage 54 is moved from its rearward position to its position inside the press 3, and vice versa.

A method according to this invention for making brake pads 60, as implemented on the apparatus 1 discussed hereinabove, will be next described.

Figure 9:
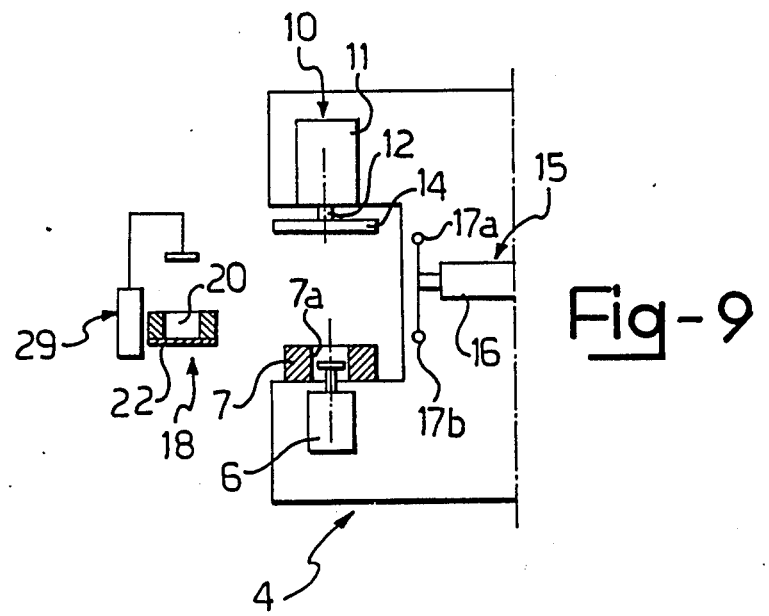
FIGS. 9 to 19 are cross-sectional views, taken along the line IX—IX in FIG. 8, showing diagramatically the apparatus of FIG. 1 at different operating stages thereof.

The starting condition of a first cycle in the manufacture of a batch consisting of twelve brake pads 60 is one whereby the multiple press 3 is in an inoperative condition, with the lower punches 5 down and the upper pressure units 10 raised. Also in that starting condition, the cold carriage 40 would occupy its rearward position, with the guillotine 45 arranged to shut off the cavities 44; the hot carriage 18, with the guillotine 22 shutting off the bottoms of the cavities 20, would be in its position outside the press 3, with the pressure means 29 at their bottom travel end positions (see FIG. 9); and the third carriage 51 for the pad holders 53 would also occupy its rearward position.

The method of this invention then provides for an initial step of feeding the cavities 44 in the cold carriage 40, which would be caused to advance stepwise by the motive means 48 through the infeed and pre-compaction station 42.

A dosage 39a of a friction material blend is first introduced into each cavity 44 and subsequently pre-compacted by the pressure unit 50a and its respective anvil 51a; on subsequent advancement, into that same cavity 40 there is introduced a sublayer 39b from the hopper 49b, and the resulting dosage 39 is pre-compacted by the pressure unit 50b and its respective anvil 51b.

Figure 10:
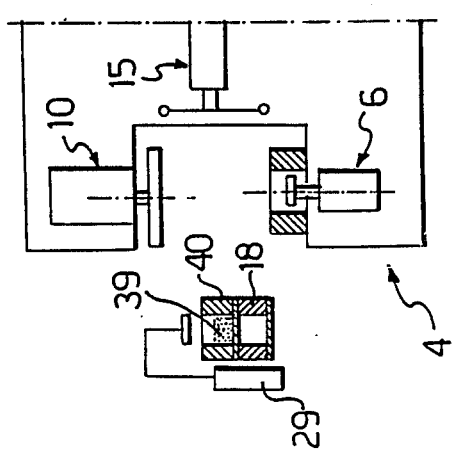

Proceeding in its advancing movement, the cold carriage 40 will run into the hot carriage 18 until the cavities 44 come to overlie the corresponding cavities 20 (see FIG. 10).

Figure 11:
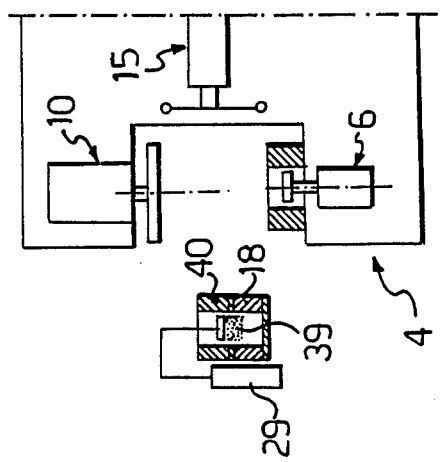

At this moment, the pressure means 29 are operated, and the drive means for the cold carriage 40 will cause the guillotine 45 to move, thereby the dosages 39 are pushed, through the apertures 46, out of the cavities 44 into the mold cavities 20 of the hot carriage 18 (see FIG. 11).

Figure 12:
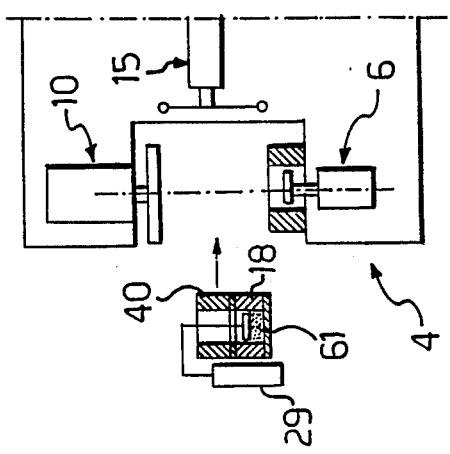

The method according to this invention then comprises the step of heat preforming the dosages 39 to produce a corresponding number, twelve in the example shown, of blanks 61. This step (see FIG. 12) is carried out in the hot carriage 18 through the pressure means 29 and the heater means 30.

Figure 13:
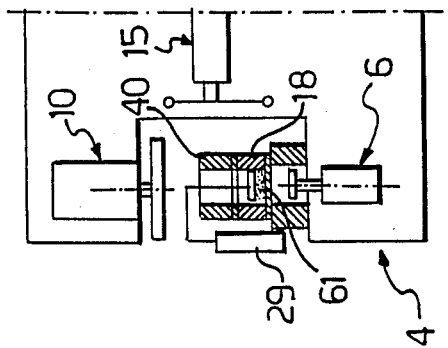

On completion of the heat preforming step, the hot carriage 18 is moved, while the cold carriage 40 retains its overlying position, by the traversing device 25 into the multiple press 3, with the mold cavities 20 overlying the molding seats 7a (see FIG. 13).

Figure 14:
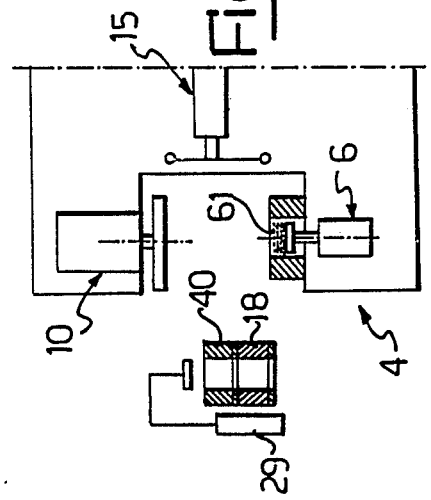

The guillotine 22 is presently moved by means of the hydraulic drive 24 until the apertures 23 come into alignment with the cavities 20, and by the action of the pressure means 29 being moved toward their bottom travel end positions, the blanks 61 are transferred into their respective molding seats 7a (see FIG. 14).

Figure 15:
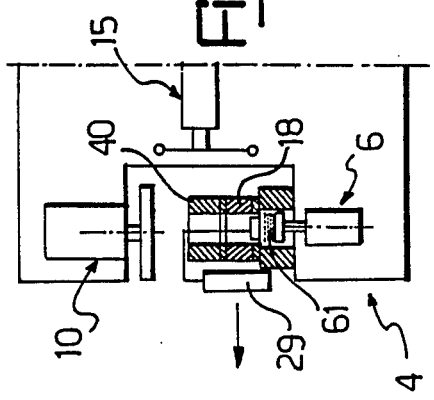

On completion of the blank transference, the hot carriage 18 and cold carriage 40 are returned to their rearward external positions with respect to the multiple press 3 (see FIG. 15).

At this stage of the manufacturing cycle, the pressure means 29 are raised back to their upper travel end positions, thus enabling the cold carriage 40 to move quickly back to its rearward position relatively to the hot carriage 18 and to then perform a renewed step of infeed and pre-compaction of friction material dosages 39 for a successive cycle of brake pad 60 making. The guillotines 22 and 45 are now shifted to again shut off the respective cavities 20 and 44.

Figure 16:
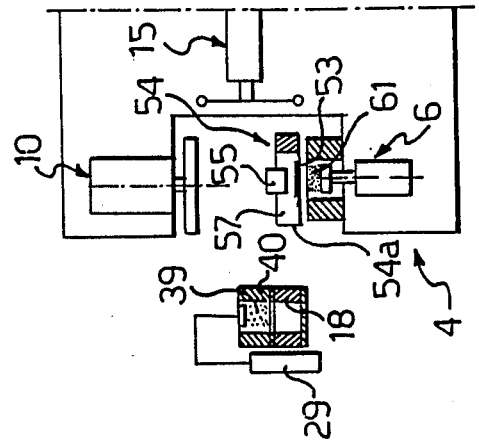
Figure 17:
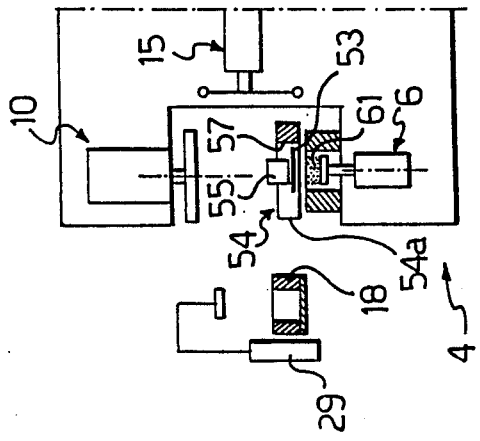

At the same time, the third carriage 54, whose cavities 57 have been previously fed with respective metal pad holders 53 from the magazines 56a of the station 56, will be moved toward the press 3 from its rearward position until it locates with the cavities 57 overlying the molding seats 7a (see FIG. 16).

Figure 18:
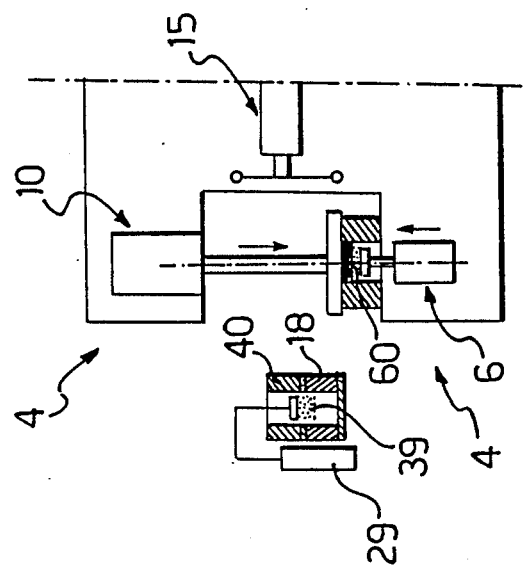

Once the electromagnets 55 of the third carriage 54 are de-energized, the pad holders 53 will be allowed to drop out of the cavities 57 onto the respective blanks 61 (see FIG. 18).

At the end of this operation, after the third carriage has moved completely out of the multiple press 3 to its rearward position and has been fed from the station 36 with a fresh batch of pad holders 53 for a successive cycle of pad 60 manufacture, the multiple press 3 will proceed with the hot molding step (see FIG. 18) by operation of the upper pressure units 10 and the lower punches 5 in conformity with appropriate molding and degasing times.

It is important to observe that in the method of this invention, the hot molding step for the blanks 61, as already heat preformed in the carriage 18, is carried out simultaneously and individually on each blank 61.

On completion of the hot molding step, the plates 14 of the upper pressure units 10 are raised and the punches 5 will simultaneously push the molded pads 60 out of the molding seats 7a, above the plane A.

Figure 19:
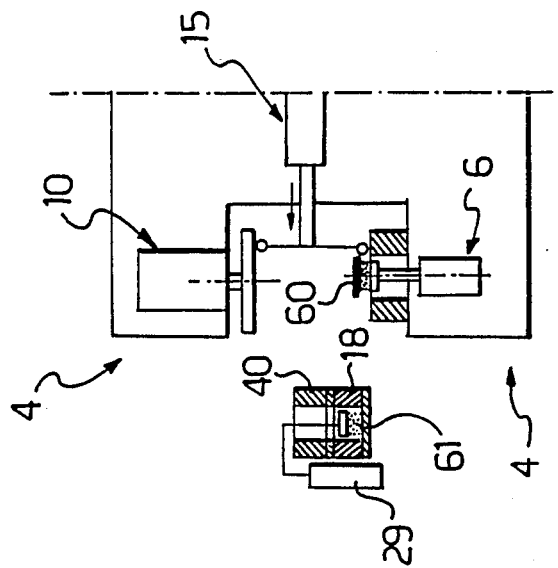

The multiple press 3 is then emptied of the brake pads 60 (see FIG. 19) by means of the emptying and cleaning devices 15 which will push the brake pads 60 out of each single press 4 with their brushes 17b, until they are dropped onto an underlying conveyor belt, known per se and omitted from the drawings.

The brake pad making cycle is completed on lowering the punches 5 and withdrawing the mold emptying and cleaning device 15.

It should be noted that, in the method of this invention, the step of heat preforming the friction material dosages in the hot carriage 18 and the step of hot molding the blanks 61 on the single presses 4 are carried out simultaneously on discrete batches.

The main advantage afforded by the method according to this invention is that the brake pads produced thereby can be homogeneous, because of their being hot molded simultaneously and individually on the multiple molding press. The product homogeneity is also a result of the operation of the inventive apparatus being suitable for full automation, to thus ensure that the times for the various steps are the same through all the production cycles.

The method according to the invention, and the apparatus provided for its implementation, have proved effective to increase the output of brake pads and the like, affording not only the well-recognized advantages from pre-heating the friction material dosages, but also utilizing the time taken by the pre-heating step to simultaneously carry out a preforming step.

Further, the possibility afforded by the apparatus for implementing the method according to the invention, whereby the heat preforming and hot molding steps can be carried out simultaneously, brings about an additional significant reduction in the production times.

Specially important is also the provision of a movable bottom for the cold and hot carriages, in that the difficulties connected with handling the friction material dosages and the blanks obtained from them can be overcome.

The apparatus disclosed hereinabove is advantageously suitable for association with another identical apparatus, to be arranged symmetrically with respect to a plane, indicated at C in FIG. 1, to combine the advantages already afforded by this invention with those resulting from the availability of two production lines which are independent operatively but clustered in a single structure sharing common facilities.

I claim:

1. An apparatus for making brake pads from a brake friction material which comprises:
   a hot molding multiple press having a plurality of molding seats and pressure members acting on the bottom of said molding seat plurality;
   a hot carriage with a first moving bottom having a plurality of hot mold cavities formed therein corresponding in number to said molding seat plurality, said carriage being movable between a first position inside said press where said hot mold cavities are aligned with said molding seats and a second position outside said press;
   a cold carriage with a second moving bottom having a plurality of cold mold cavities corresponding in number to said hot mold cavities movable between a first position in which said cold carriage overlies said hot carriage and said cold mold cavities are aligned with said hot mold cavities and a second position in which said cold carriage is remote from said hot carriage; and
   pressure means and heater means mounted on the hot carriage and acting on said hot mold cavities.

2. An apparatus according to claim 1 which comprises a plurality of single hot molding presses in side-by-side alignment and each of said single presses overlies a molding seat.

3. An apparatus according to claim 2 wherein said hot carriage has an elongate box type shape and extends parallel to said single presses.

4. An apparatus according to claim 1 wherein said moving bottom of said hot carriage comprises a sheet like guillotine supported slidingly on said carriage and is provided with a plurality of aligned and mutually spaced apart apertures and wherein said guillotine may be moved to a position in which said apertures are aligned with said hot mold cavities.

5. An apparatus according to claim 1 wherein said plurality of hot mold cavities are formed in a substantially parallelepipedic body carried inside said hot carriage.

6. An apparatus according to claim 1 wherein said cold carriage is slidable along said hot carriage and movable by the action of a hydraulic drive means (48).

7. An apparatus according to claim 6, wherein said moving bottom of said cold carriage comprises a sheet like guillotine supported slidingly on said cold carriage and being provided with a plurality of aligned and mutually spaced apart apertures and wherein said guillotine may be moved to a position in which said apertures are aligned with said cold mold cavities.

8. An apparatus according to claim 5, wherein in the first position of said cold carriage, the cavities of said cold carriage overlie the corresponding cavities of said hot carriage.

9. An apparatus according to claim 7, wherein in the first position of said cold carriage, the cavities of said cold carriage overlie the corresponding cavities of said hot carriage.

10. An apparatus according to claim 2 which comprises means for feeding brake pad metal holders to said plurality of molding seats, said means including a pad holder carriage having a plurality of pad holder cavities, said pad holder carriage being supported on said apparatus in substantial alignment with said single hot molding presses and being movable between a first position in which said pad holder carriage lies within said hot molding press and said pad holder cavities overlie and are aligned with said molding seats and a second position in which said pad holder carriage lies outside of said hot molding press.

11. An apparatus according to claim 1 which comprises a plurality of punches corresponding in number to that of the molding seats and wherein at least one punch is aligned with each molding seat.

12. An apparatus according to claim 1 which comprises means for emptying said press wherein said emptying means includes a hydraulic unit operatively connected to a brush for reciprocating said brush in a horizontal plane.

13. An apparatus according to claim 1 further comprising feed means for filling said cold mold cavities with loose friction material particles and compacting means for compacting the friction material particles in each cold mold cavity.

14. An apparatus according to claim 13 in which said compacting means includes a hydraulic pressure unit which overlies one of the top or the bottom of said cold mold cavities and a reactive member which overlies the other of said top or bottom of said cold mold cavities.

15. An apparatus according to claim 10 in which said pad holder carriage includes a plurality of electromagnets operatively associated with each pad holder cavity to alternatively retain metal pad holders within said pad holder cavities when said pad holder carriage lies outside of said press and to release metal pad holders from said pad holder cavities when said pad holder carriage is in said second position.

16. A method of making brake pads from a brake friction material on a multiple press hot molding machine having a plurality of hot molding presses including molding seats and heater means; a movable hot carriage including a plurality of hot molding cavities and a first moving bottom; a movable cold carriage including a plurality of cold molding cavities and a second moving bottom; a feeding station; and a movable metal pad holder carriage comprising the steps of:

feeding friction material dosages into said cold molding cavities in said cold carriage to form cold preforms;
aligning said cold molding cavities with said hot molding cavities;
driving said cold preforms from said cold molding cavities into said hot molding cavities;
heating and compressing said cold preforms in said hot molding cavities to form preformed brake shoe blanks;
moving said hot carriage into said press;
transferring said preformed brake shoe blanks to said molding seats;
removing said hot carriage from said press;
moving said metal pad holder carriage into said press such that said pad holder cavities overlie said molding seats;
transferring metal pad holders from said pad holder cavities to said molding seats;
removing said metal pad holder carriage from said press;
heating and compressing said preformed brake shoe blanks and said pad holders to obtain a completed brake pad; and
removing said completed brake pads from said molding seats.

17. The method according to claim 16, which comprises the additional step of compacting said friction material dosages in said cold molding cavities.

18. The method according to claim 16, in which said second moving carriage bottom further comprises a plurality of spaced apertures which in one position are aligned with the bottom of said cold molding cavities and in an other position are spaced from the bottom of said cold molding cavities and comprising the further step of moving said second moving carriage bottom to said one position prior to driving said cold preforms from said cold molding cavities to said hot molding cavities.

19. The method according to claim 16, in which said first moving carriage bottom further comprises a plurality of spaced apertures which in one position are aligned with the bottom of said hot molding cavities and in an other position are spaced from the bottom of said hot molding cavities and comprising the further step of moving said first moving carriage bottom to said one position prior to transferring said preformed brake shoe blanks to said molding seats.

20. The method according to claim 16, in which said movable metal pad holder carriage further comprises a plurality of spaced apertures which in one position of said metal pad holder carriage are aligned with said molding seats and in an other position are remote from said molding seats comprising the further step of moving said movable metal pad holder carriage to said one position prior to transferring said metal pad holders from said pad holder cavities to said molding seats.

* * * * *